US012780290B2

(12) United States Patent
Kwon

(10) Patent No.: US 12,780,290 B2
(45) Date of Patent: Nov. 3, 2026

(54) STEER-BY-WIRE STEERING DEVICE

(71) Applicant: HL MANDO CORPORATION, Pyeongtaek-si (KR)

(72) Inventor: Hyunbi Kwon, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 481 days.

(21) Appl. No.: 18/369,454

(22) Filed: Sep. 18, 2023

(65) Prior Publication Data

US 2024/0101183 A1 Mar. 28, 2024

(30) Foreign Application Priority Data

Sep. 23, 2022 (KR) ........................ 10-2022-0120885

(51) Int. Cl.

| | |
|---|---|
| ***B62K 25/30*** | (2006.01) |
| ***B62D 5/00*** | (2006.01) |
| ***B62D 15/02*** | (2006.01) |
| ***B62K 3/02*** | (2006.01) |
| ***B62K 25/04*** | (2006.01) |

(52) U.S. Cl.

CPC ......... *B62D 5/005* (2013.01); *B62D 15/0215* (2013.01)

(58) Field of Classification Search

CPC ...... B62D 5/005; B62D 5/00; B62D 15/0215; B62D 5/006; B62D 5/0463; B62D 1/18; B60Y 2306/13; F16H 27/06

USPC .......................................................... 180/402

See application file for complete search history.

(56) References Cited

U.S. PATENT DOCUMENTS

| | | | | |
|---|---|---|---|---|
| 1,095,373 | A * | 5/1914 | Bruce | F16H 27/06 74/436 |
| 8,855,862 | B2 * | 10/2014 | Tashiro | B66F 9/07568 180/402 |
| 2018/0141585 | A1 * | 5/2018 | Kim | B62D 5/001 |
| 2018/0162442 | A1 * | 6/2018 | Hwang | B62D 6/008 |

FOREIGN PATENT DOCUMENTS

| | | | |
|---|---|---|---|
| JP | 2009280073 A | * 12/2009 | B62D 1/16 |

OTHER PUBLICATIONS

Geneva Drive—Wikipedia. Retrieved from Wayback machine, URL: https://en.wikipedia.org/wiki/Geneva_drive?wprov=sfla1 on Jan. 21, 2026. (Year: 2021).*

* cited by examiner

*Primary Examiner* — Vivek D Koppikar
*Assistant Examiner* — Nabin Kumar Sharma
(74) *Attorney, Agent, or Firm* — Hauptman Ham, LLP

(57) ABSTRACT

According to the present embodiments, there may be provided a steer-by-wire steering device with a simplified structure, reduced restrictions to installation space, lower production costs, and reliable steering sensing structure.

18 Claims, 6 Drawing Sheets

(A) (B)

STEER-BY-WIRE STEERING DEVICE

CROSS-REFERENCE TO RELATED APPLICATION

This application claims priority from Korean Patent Application No. 10-2022-0120885, filed on Sep. 23, 2022, which is hereby incorporated by reference for all purposes as if fully set forth herein.

BACKGROUND

Field

The present embodiments relates to a steer-by-wire steering device and, more specifically, to a steer-by-wire steering device with a simplified structure, reduced restrictions to installation space, lower production costs, and reliable steering sensing structure.

DESCRIPTION OF RELATED ART

A steer-by-wire steering device is a kind of electromotive steering device that steers the vehicle using electric power without any mechanical connection, such as a steering column or universal joint, between the steering wheel and the front wheel steering device.

In other words, the driver's manipulation of the steering wheel is converted into an electric signal, and the electronic control device receives the electric signal and accordingly determines the output of the motor. Due to a lack of mechanical connection, the steer-by-wire system reduces injury to the driver by a mechanical part when a car crash occurs. Further, by saving parts, e.g., hydraulic parts and mechanical connections, the steer-by-wire system may lead to lightweight vehicles and a significant reduction in assembly line man-hour, thereby saving unnecessary energy consumption during steering and hence enhancing fuel efficiency. Further, it is possible to achieve ideal steering performance by ECU programming.

Due to lack of mechanical linkage between the steering shaft and the wheels, steer-by-wire steering devices do not directly convey the sensation of weight, coming from wheel friction against the road or being stuck, to the driver. There are known structures that provide the sense of steering to the driver by arbitrarily generating a steering reaction force using, e.g., a motor.

However, the conventional steer-by-wire steering device requires a reducer for connecting the motor shaft and the steering shaft as well as a motor for generating steering reaction force and a control system for controlling the motor, which leads to a complicated structure, the need for a wider installation space, and an increase in production costs. Thus, the conventional steer-by-wire steering device is difficult to apply to small or low-cost vehicles.

Meanwhile, since the steer-by-wire steering device requires a sensor to sense the driver's steering angle to steer the wheels, the reliability of the steering angle sensing is also required.

Therefore, a need exists for a steer-by-wire steering device that may have a simplified structure and reduces the installation space and production costs by mechanically generate a steering reaction force. A need also exists fora steer-by-wire steering device with a reliable steering angle sensing structure.

BRIEF SUMMARY

Conceived in the foregoing background, the present embodiments relate to a steer-by-wire steering device with a simplified structure, reduced restrictions to installation space, lower production costs, and reliable steering sensing structure.

According to the present embodiments, there may be provided a steer-by-wire steering device comprising a steering shaft, a steering column receiving the steering shaft, and a reaction force generator coupled to the steering column and including a gear rotated in engagement with the steering shaft, a plate having a guide rail, a pin moved on the guide rail as the gear rotates, and an elastic member providing a restoring force to a center of the guide rail to the pin.

According to the present embodiments, there may be provided a steer-by-wire steering device comprising a steering wheel and a reaction force generator coupled to a vehicle body and including a gear rotated in engagement with the steering wheel, a plate having a guide rail, a pin moved on the guide rail as the gear rotates, and an elastic member providing a restoring force to a center of the guide rail to the pin.

According to the present embodiments, there may be provided a steer-by-wire steering device with a simplified structure, reduced restrictions to installation space, lower production costs, and reliable steering sensing structure.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
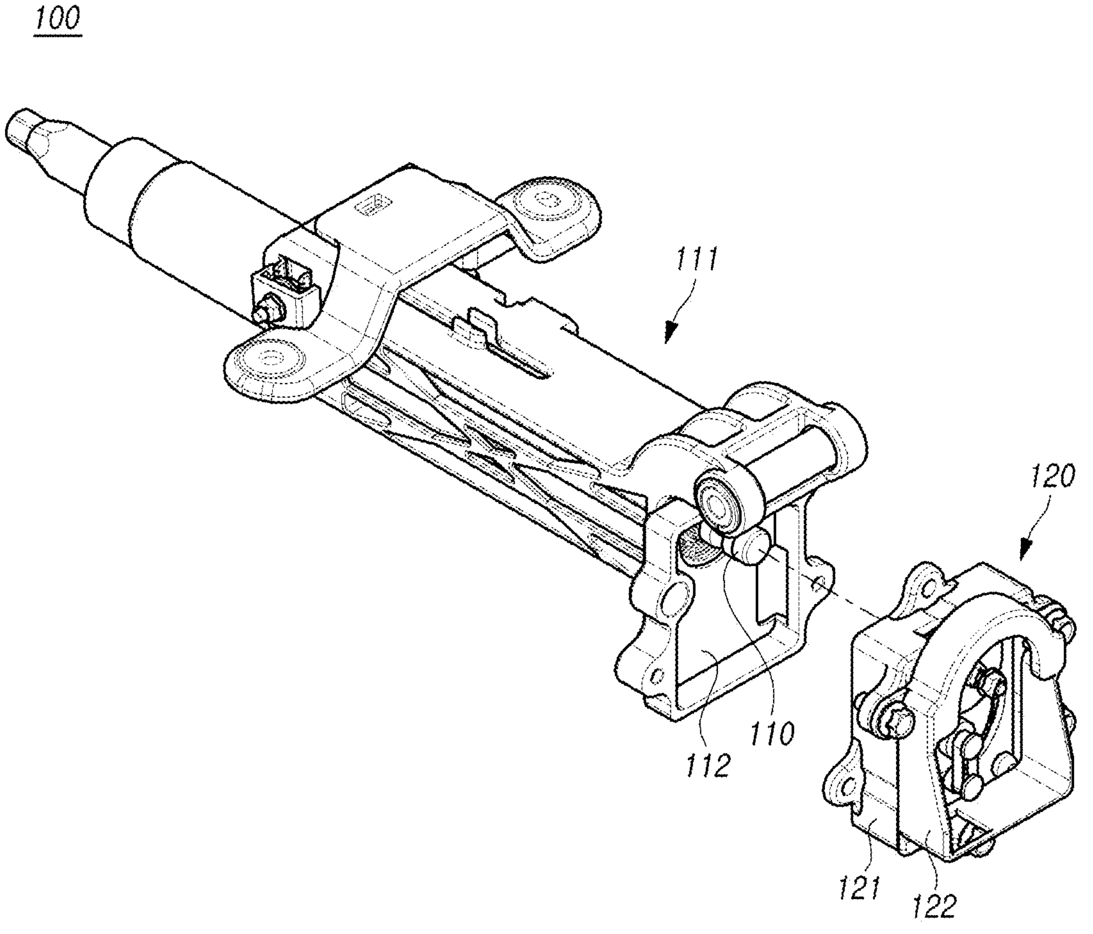
FIG. 1 is an exploded perspective view illustrating a steer-by-wire steering device according to the present embodiments.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
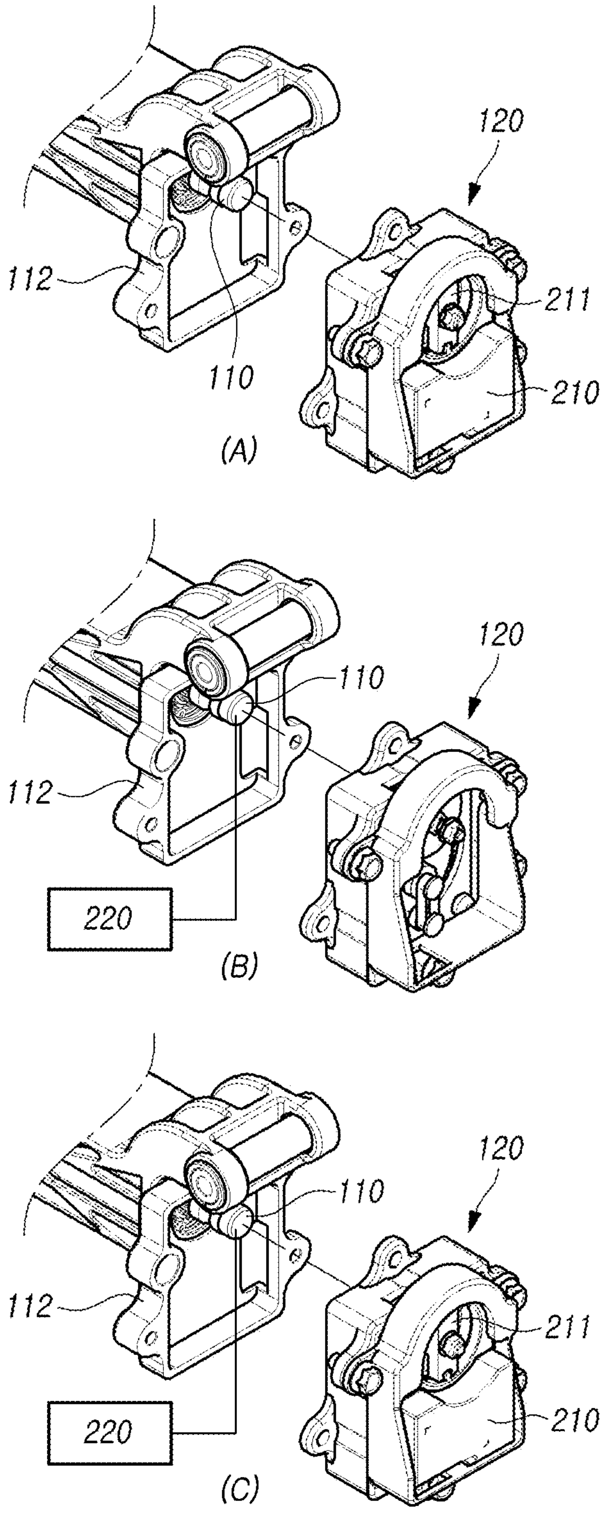
FIG. 2 is an exploded perspective view illustrating a steer-by-wire steering device according to the present embodiments.
Figure 3:
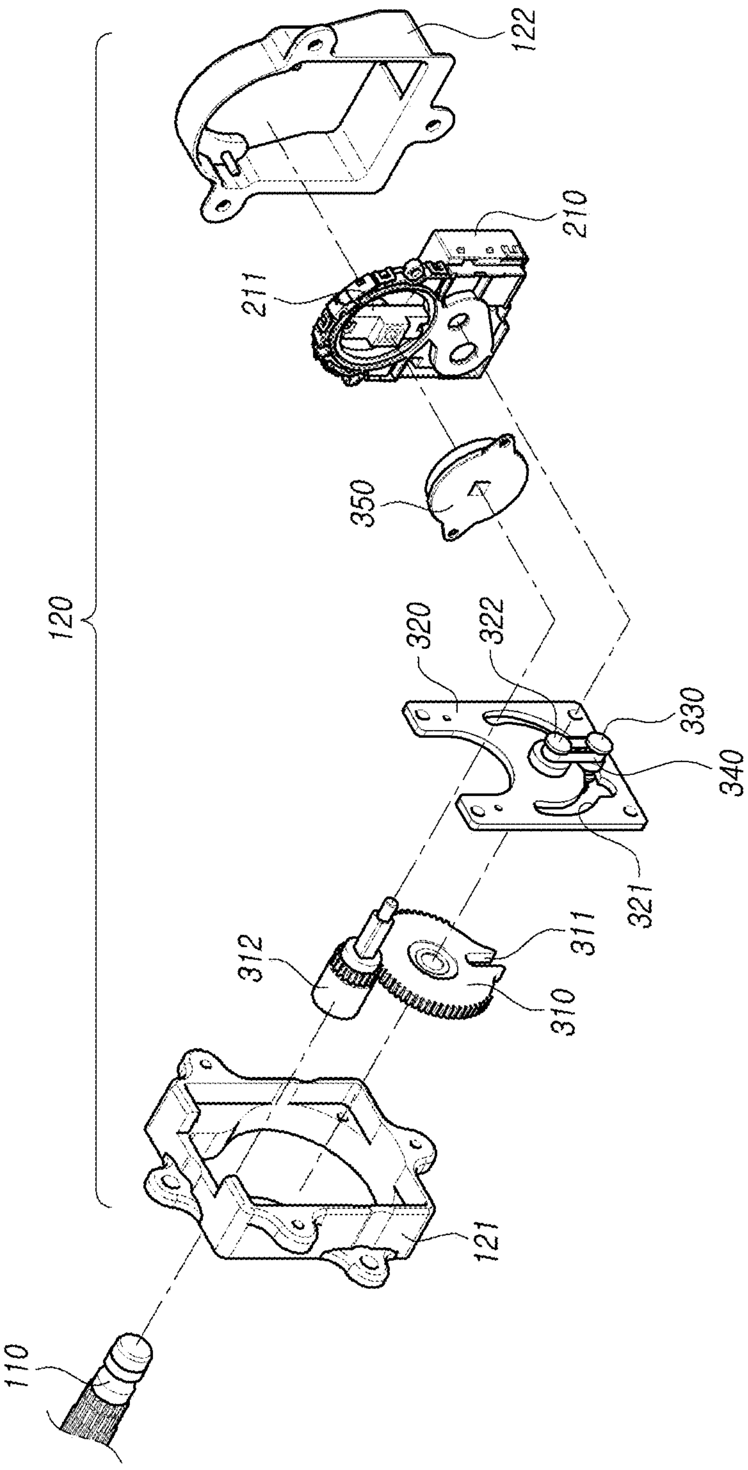
FIG. 3 is an exploded perspective view illustrating a portion of a steer-by-wire steering device according to the present embodiments.
Figure 4:
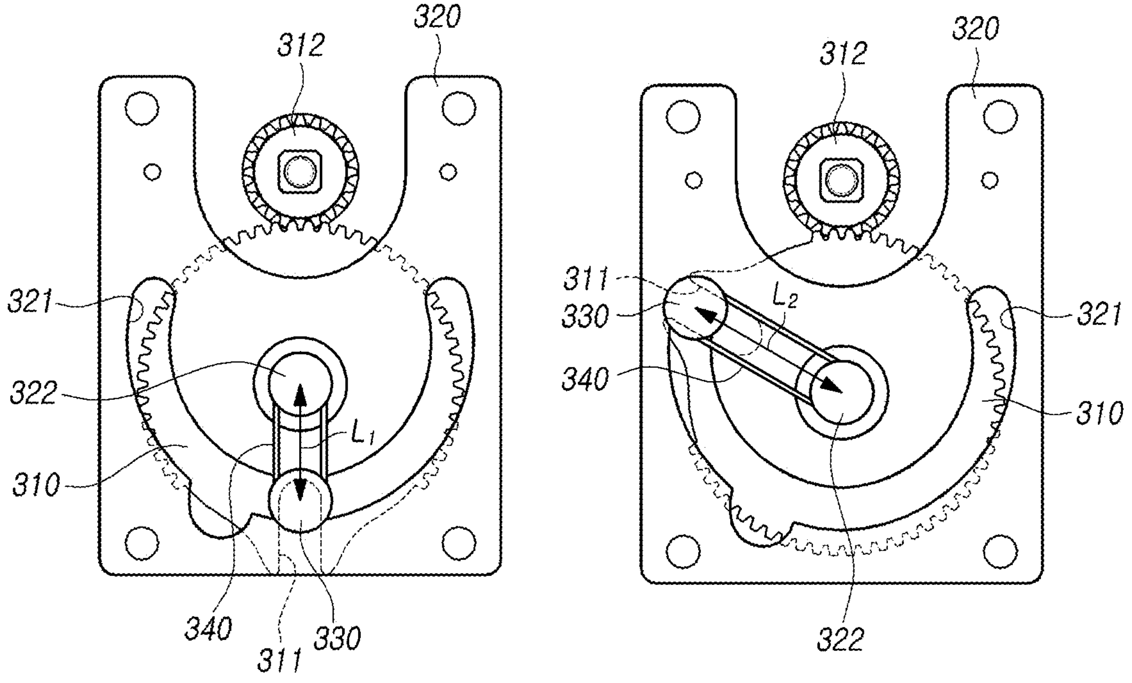
FIG. 4 is a view illustrating an operational state of a portion of a steer-by-wire steering device according to the present embodiments.
Figure 5:
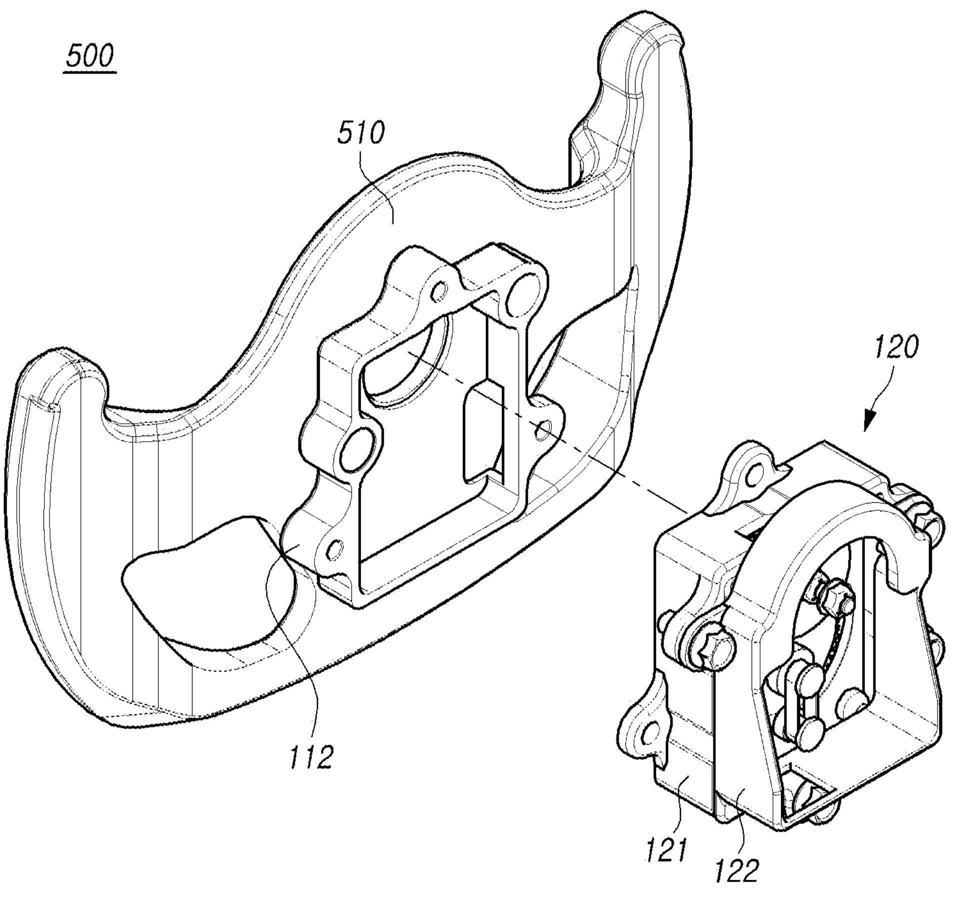
FIG. 5 is an exploded perspective view illustrating a steer-by-wire steering device according to the present embodiments.
Figure 6:
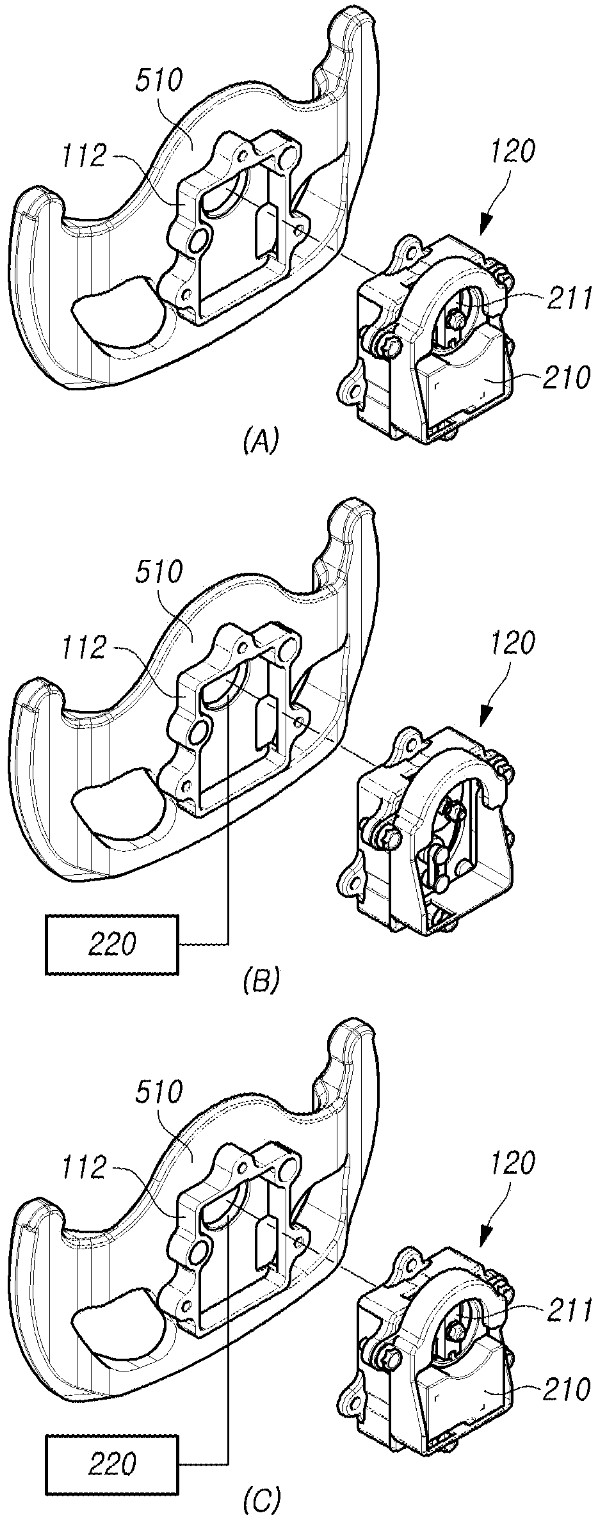
FIG. 6 is an exploded perspective view illustrating a steer-by-wire steering device according to the present embodiments.

FIG. 1 is an exploded perspective view illustrating a steer-by-wire steering device according to the present embodiments. FIG. 2 is an exploded perspective view illustrating a steer-by-wire steering device according to the present embodiments. FIG. 3 is an exploded perspective view illustrating a portion of a steer-by-wire steering device according to the present embodiments. FIG. 4 is a view illustrating an operational state of a portion of a steer-by-wire steering device according to the present embodiments. FIG. 5 is an exploded perspective view illustrating a steer-by-wire steering device according to the present embodiments. FIG. 6 is an exploded perspective view illustrating a steer-by-wire steering device according to the present embodiments.

Referring to FIGS. 1 to 4, 1. a steer-by-wire steering device 100 includes a steering shaft 110, a steering column 111 receiving the steering shaft 110 and a reaction force generator 120 coupled to the steering column 111 and including a gear 310 rotated in engagement with the steering shaft 110, a plate 320 having a guide rail 321, a pin 330 moved on the guide rail 321 as the gear 310 rotates, and an elastic member 340 providing a restoring force to a center of the guide rail 321 to the pin 330.

Referring to FIG. 1, the reaction force generator 120 is coupled to the steering column 111 and connected to the steering shaft 110. The reaction force generator 120 may be coupled to an end of the steering column 111 and connected to the steering shaft 110 protruding from the end of the steering column 111. The structure of the steering column 111 is similar to that commonly known, and thus a detailed description thereof will be omitted.

The reaction force generator 120 generates a steering reaction force generated by the rotation of the steering shaft 110 to the steering shaft 110, and the driver receives the steering reaction force mechanically generated by the reaction force generator 120. The steering reaction force provided by the reaction force generator 120 is directly generated by the rotation of the steering shaft 110. The steering reaction force provided by the reaction force generator 120 is mechanically generated by the rotation of the steering shaft 110. The reaction force generator 120 may generate the steering reaction force without including a motor connected to the steering shaft 110 and/or an ECU for controlling the motor. Therefore, it is possible to provide a sense of steering to the driver with a simpler structure, eliminate the need for a wide installation space, and reduce production costs.

The reaction force generator 120 includes a housing 121 and a cover 122. The cover 122 is coupled to the housing 121 and may receive the gear 310, the plate 320, the pin 330, and the elastic member 340. Further, according to an embodiment, the reaction force generator 120 may further include a sensor 210 for sensing the steering angle, and the sensor 210 may likewise be received between the housing 121 and the cover 122. The housing 121 of the reaction force generator 120 may be coupled to a coupling portion 112 formed at an end portion of the steering column 111. The housing 121 may be coupled to the coupling portion 112 by, e.g., bolting, and therefore, it is easy to attach and detach for repair, specification change, and the like. The specific structure of the reaction force generator 120 for mechanically generating the steering reaction force by the rotation of the steering shaft 110 is described in detail with reference to FIGS. 3 and 4. First, referring to FIG. 2, the sensor for sensing the steering angle is described.

The steer-by-wire steering device 100 according to the present embodiments may further include a sensor for sensing the steering angle. The sensed steering angle is provided to the road wheel actuator (RWA) and used to steer the wheel. The RWA includes a sliding bar connected to the wheel and a motor for steering the wheel by sliding the sliding bar. Two opposite ends of the sliding bar are connected to the wheels by tie rods, and the wheels are steered as the sliding bar slides in the axial direction. The RWA may further include a reducer connecting the motor and the sliding bar. For example, the sliding bar may have a rack gear, and the RWA may include a pinion gear engaged with the rack gear. The controller for controlling the motor may receive the sensed steering angle and, based on the received steering angle, steer the wheel by driving the motor.

Referring to FIG. 2(A), according to an embodiment, the reaction force generator 120 may further include a sensor 210 for sensing the steering angle of the steering shaft 110. The sensor 210 is received between the housing 121 and the cover 122. The sensor 210 may include a rotor 211 coupled to an end portion of the steering shaft 110 and sense the steering angle from rotation of the rotor 211. The sensor 210 senses the steering angle of the steering shaft 110 and provides it to the RWA.

Referring to FIG. 2(B), the steer-by-wire steering device 100 according to an embodiment may further include a sensor 220 for sensing the steering angle of the steering shaft 110. The sensor 220 is provided independently of the reaction force generator 120. The sensor 220 may be provided inside or outside the steering column 111. The sensor 220 senses the steering angle of the steering shaft 110 and provides it to the RWA.

Referring to FIG. 2(C), according to an embodiment, the reaction force generator 120 may further include a first sensor 210 for sensing the steering angle of the steering shaft 110. The steer-by-wire steering device 100 may further include a second sensor 220 for sensing the steering angle of the steering shaft 110. The first sensor 210 and the second sensor 220 may receive power from power sources independent from each other. The first sensor 210 and the second sensor 220 each independently sense the steering angle and provide the sensed steering angle information to the RWA. Accordingly, even when the steering angle information is not provided to the RWA due to a failure in either the first sensor 210 or the second sensor 220, the other sensor may provide the steering angle information to the RWA, thereby securing reliability. Further, as the first sensor 210 and the second sensor 220 receive power from power sources independent from each other, a situation in which the first sensor 210 and the second sensor 220 simultaneously fail to provide the steering angle information to the RWA due to a power failure may be avoided, further enhancing reliability.

A detailed configuration and operation of the reaction force generator 120 is described with reference to FIGS. 3 and 4.

The reaction force generator 120 includes a gear 310 rotated in engagement with the steering shaft 110, a plate 320 having a guide rail 321, a pin 330 moved on the guide rail 321 as the gear 310 rotates, and an elastic member 340 providing a restoring force to the center of the guide rail 321 to the pin 330.

The gear 310 is rotated by rotation of the steering shaft 110. As illustrated in the drawings, the gear 310 may be engaged with the steering shaft 110 via an intermediate shaft 312. The intermediate shaft 312 is coupled to an end portion of the steering shaft 110, and has gear teeth engaged with the gear 310. As is described below, the maximum steering angle may be limited or adjusted by using the gear ratio between the intermediate shaft 312 and the gear 310 and the moving distance of the pin 330 on the guide rail 321.

The plate 320 has a guide rail 321, and the pin 330 may be inserted into the guide rail 321 to move along the guide rail 321. In the drawings, an embodiment in which the guide rail 321 is substantially in an arc shape is illustrated, but embodiments are not necessarily limited thereto. For example, the guide rail 321 may have a straight or curved shape. The pin 330 moves on the guide rail 321 as the gear 310 rotates.

The elastic member 340 provides a restoring force to the center of the guide rail 321 to the pin 330. The restoring force provided by the elastic member 340 to the pin 330 becomes the steering reaction force provided to the steering shaft 110 through the gear 310, the intermediate shaft 312, and the like. In the neutral state of the steering wheel, the pin 330 is located in the middle of the guide rail 321 (see FIG. 4(A)), and as the steering angle increases, the restoring force by the elastic member 340 increases. In other words, as the driver manipulates the steering wheel, the steering reaction force is mechanically generated, and the steering wheel is returned to the neutral position by the steering reaction force (On-Centering). As long as the elastic member 340 is capable of providing a restoring force to the pin 330, the elastic member 1140 is not limited to the shape illustrated in the drawings. For example, the elastic member 340 may be a coil spring.

The rotation of the steering shaft 110 may be stopped as the pin 330 is supported on two opposite ends of the guide rail 321. In other words, the moving range of the pin 330 may be limited between two opposite ends of the guide rail 321, and the rotation of the gear 310 and the steering shaft 110 may be limited as the moving range of the pin 330 is limited. The maximum steering angle of the steering shaft 110 may be adjusted to the moving range of the pin 330 on the guide rail 321 and the gear ratio between the gear 310 and the steering shaft 110. For example, if the rotation angle of the gear 310 is limited to a total of 240 degrees by the pin 330 and the guide rail 321 and the gear ratio of the gear 310 to the steering shaft 110 is 1:3, the rotation range of the steering shaft 110 is limited to 720 degrees (one turn to the left and right).

An embodiment in which a restoring force is provided by the elastic member 340 is described in more detail. The plate 320 may be provided with a central shaft 322 to which one end of the elastic member 340 is coupled, and the other end of the elastic member 340 may be coupled to the pin 330. In other words, two opposite ends of the elastic member 340 are coupled to the central shaft 322 and the pin 330, respectively. Further, the guide rail 321 may be formed such that the center thereof is closest to the central shaft 322 and farther away from the central shaft toward two opposite ends thereof.

As illustrated in FIG. 4, as the center of the guide rail 321 is formed to be closest to the central shaft 322, when the pin 330 is located at the center of the guide rail 321, the length of the elastic member 340 is the shortest as L1. As the pin 330 moves from the center of the guide rail 321 toward two opposite ends, the distance between the pin 330 and the central shaft 322 increases, and the length of the elastic member 340 increases. Accordingly, the elastic member 340 provides a restoring force to the center of the guide rail 321 to the pin 330. The length of the elastic member 340 is the longest as L2 when the pin 330 is positioned at two opposite ends of the guide rail 321. According to an embodiment, the elastic member 340 may be a belt connected to the central shaft 322 and the pin 330.

As illustrated in the drawings, the gear 310 may be provided coaxially with the central shaft 322. The gear 310 may be coupled to the central shaft 322 through a bearing. The gear 310 may have a slit 311 where the pin 330 is inserted to be movable on the guide rail 321 as the gear 310 rotates. In other words, the pin 330 is simultaneously inserted into the slit 311 of the gear 310 and the guide rail 321 of the plate 320. However, since the distance between the pin 330 and the central shaft 322 is changed in the radial direction by the shape of the guide rail 321, the slit 311 provides a path through which the pin 330 may be moved in the radial direction. In other words, the slit 311 is formed to have a radial length greater than or equal to the distance difference L2-L1 between the center of the guide rail 321 and the central shaft 322 at two opposite ends thereof, so that the pin 330 is moved in the circumferential direction and the radial direction on the guide rail 321 and the slit 311.

Further, the reaction force generator 120 may further include a damper 350 for providing damping to rotation of the steering shaft 110. The damper 350 may be coupled to an end portion of the intermediate shaft 312 as shown in the drawings. The damper 350 may prevent the driver's abrupt steering wheel manipulation or sudden steering wheel rotation by the steering reaction force.

Hereinafter, a steer-by-wire steering device 500 according to the present embodiments is described with reference to FIGS. 5 and 6, and the same components as those of the above-described embodiments will be denoted by the same reference numerals, and detailed descriptions thereof will be omitted.

A steer-by-wire steering device 500 according to the present embodiments includes a steering wheel 510 and a reaction force generator 120 coupled to a vehicle body and including a gear 310 rotated in engagement with the steering wheel 510, a plate 320 having a guide rail 321, a pin 330 moved on the guide rail 321 as the gear 310 rotates, and an elastic member 340 providing a restoring force to a center of the guide rail 321 to the pin 330.

The reaction force generator 120 is directly connected to the steering wheel 510 to provide a steering reaction force. The reaction force generator 120 generates a steering reaction force generated by the rotation of the steering wheel 510 to the steering wheel 510, and the driver receives the steering reaction force mechanically generated by the reaction force generator 120. The steering reaction force provided by the reaction force generator 120 is directly generated by the rotation of the steering wheel 510. The steering reaction force provided by the reaction force generator 120 is mechanically generated by the rotation of the steering wheel 510. The reaction force generator 120 may generate the steering reaction force without including a motor connected to the steering wheel 510 and/or an ECU for controlling the motor. Therefore, it is possible to provide a sense of steering to the driver with a simpler structure, eliminate the need for a wide installation space, and reduce production costs.

The housing 121 of the reaction force generator 120 is coupled to the vehicle body and the intermediate shaft 312 is coupled to the steering wheel 510 so that the steering reaction force generated by the reaction force generator 120 may be provided to the steering wheel 510. A coupling portion 112 is provided at a position adjacent to the rear surface of the steering wheel 510, and the housing 121 of the reaction force generator 120 may be coupled to the coupling portion 112. The coupling portion 112 may be coupled to the frame of the vehicle body, directly or via a bracket. The vehicle body portion provided with the coupling portion 112 may be fixed, or may be movable for telescoping, tilting, and/or stowing. For example, the coupling portion 112 may be coupled to the inner surface of the dashboard.

According to an embodiment, the reaction force generator 120 may further include a sensor 120 for sensing the steering angle of the steering wheel 510.

The steer-by-wire steering device 500 according to an embodiment may further include a sensor 220 for sensing the steering angle of the steering wheel 510.

According to an embodiment, the reaction force generator 120 may further include a first sensor 210 for sensing the steering angle of the steering wheel 510. The steer-by-wire steering device 500 may further include a second sensor 220 for sensing the steering angle of the steering wheel 510. The first sensor 210 and the second sensor 220 may receive power from power sources independent from each other. The first sensor 210 and the second sensor 220 each independently sense the steering angle and provide the sensed steering angle information to the RWA. Accordingly, even when the steering angle information is not provided to the RWA due to a failure in either the first sensor 210 or the second sensor 220, the other sensor may provide the steering angle information to the RWA, thereby securing reliability. Further, as the first sensor 210 and the second sensor 220 receive power from power sources independent from each other, a situation in which the first sensor 210 and the second sensor 220 simultaneously fail to provide the steering angle information to the RWA due to a power failure may be avoided, further enhancing reliability.

According to an embodiment, the rotation of the steering wheel 510 may be stopped as the pin 330 is supported on two opposite ends of the guide rail 321.

According to an embodiment, the plate 320 may be provided with a central shaft 322 to which one end of the elastic member 340 is coupled, the other end of the elastic member 340 may be coupled to the pin 330, and the guide rail 321 may be formed such that the center thereof is closest to the central shaft 322 and is farther away from the central shaft 322 toward two opposite ends thereof.

According to an embodiment, the elastic member 340 may be a belt connected to the central shaft 322 and the pin 330.

According to an embodiment, the gear 310 may be provided coaxially with the central shaft 322.

According to an embodiment, the gear 310 may have a slit 311 that provides a path where the pin 330 is inserted to be movable in a radial direction.

According to an embodiment, the reaction force generator 120 may further include a damper 350 for providing damping to rotation of the steering wheel 510.

By the so-shaped steer-by-wire steering device, it is possible to provide a reduced restrictions to installation space, lower production costs, and reliable steering sensing structure by a simplified structure.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A steer-by-wire steering device, comprising:

a steering shaft;

a steering column receiving the steering shaft; and a reaction force generator coupled to the steering column and including a gear rotated in engagement with the steering shaft, a plate having a guide rail, a pin moved on the guide rail as the gear rotates, and an elastic member providing a restoring force to a center of the guide rail to the pin, wherein the plate has a central shaft coupled with one end of the elastic member, wherein an other end of the elastic member is coupled to the pin, wherein the guide rail is formed to be closest to the central shaft in a center thereof and to be away from the central shaft toward two opposite ends thereof, and wherein as a steering angle of the steering shaft increases, the restoring force of the elastic member increases to increase a steering reaction force.

2. The steer-by-wire steering device of claim 1, wherein the reaction force generator further includes a sensor configured to sense the steering angle of the steering shaft.

3. The steer-by-wire steering device of claim 1, further comprising a sensor configured to sense the steering angle of the steering shaft.

4. The steer-by-wire steering device of claim 1, wherein the reaction force generator further includes a first sensor configured to sense the steering angle of the steering shaft, wherein the steer-by-wire steering device further comprises a second sensor configured to sense the steering angle of the steering shaft, and wherein the first sensor and the second sensor are configured to receive power from power sources independent from each other.

5. The steer-by-wire steering device of claim 1, wherein rotation of the steering shaft is stopped as the pin is supported on two opposite ends of the guide rail.

6. The steer-by-wire steering device of claim 1, wherein the elastic member is a belt connected to the central shaft and the pin.

7. The steer-by-wire steering device of claim 1, wherein the gear is provided to be coaxial with the central shaft.

8. The steer-by-wire steering device of claim 1, wherein the reaction force generator further includes a damper configured to provide damping to rotation of the steering shaft.

9. The steer-by-wire steering device of claim 7, wherein the gear has a slit that provides a path where the pin is inserted and movable in a radial direction.

10. A steer-by-wire steering device, comprising:

a steering wheel; and a reaction force generator coupled to a vehicle body and including a gear rotated in engagement with the steering wheel, a plate having a guide rail, a pin moved on the guide rail as the gear rotates, and an elastic member providing a restoring force to a center of the guide rail to the pin, wherein the plate has a central shaft coupled with one end of the elastic member, wherein an other end of the elastic member is coupled to the pin, wherein the guide rail is formed to be closest to the central shaft in a center thereof and to be away from the central shaft toward two opposite ends thereof, and wherein as a steering angle of the steering wheel increases, the restoring force of the elastic member increases to increase a steering reaction force.

11. The steer-by-wire steering device of claim 10, wherein the reaction force generator further includes a sensor configured to sense the steering angle of the steering wheel.

12. The steer-by-wire steering device of claim 10, further comprising a sensor configured to sense the steering angle of the steering wheel.

13. The steer-by-wire steering device of claim 10, wherein the reaction force generator further includes a first sensor configured to sense the steering angle of the steering wheel, wherein the steer-by-wire steering device further comprises a second sensor configured to sense the steering angle of the steering wheel, and wherein the first sensor and the second sensor are configured to receive power from power sources independent from each other.

14. The steer-by-wire steering device of claim 10, wherein rotation of the steering wheel is stopped as the pin is supported on two opposite ends of the guide rail.

15. The steer-by-wire steering device of claim 10, wherein the elastic member is a belt connected to the central shaft and the pin.

16. The steer-by-wire steering device of claim 10, wherein the gear is provided to be coaxial with the central shaft.

17. The steer-by-wire steering device of claim 10, wherein the reaction force generator further includes a damper configured to provide damping to the rotation of the steering wheel.

18. The steer-by-wire steering device of claim 16, wherein the gear has a slit that provides a path where the pin is inserted and movable in a radial direction.

* * * * *